US006961392B2

(12) United States Patent
Heegard et al.

(10) Patent No.: US 6,961,392 B2
(45) Date of Patent: Nov. 1, 2005

(54) JOINT EQUALIZATION AND DECODING USING A SEARCH-BASED DECODING ALGORITHM

(75) Inventors: Chris Heegard, Santa Rosa, CA (US); Matthew B. Shoemake, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 762 days.

(21) Appl. No.: 09/922,366

(22) Filed: Aug. 3, 2001

(65) Prior Publication Data

US 2002/0037059 A1 Mar. 28, 2002

Related U.S. Application Data

(60) Provisional application No. 60/226,161, filed on Aug. 18, 2000.

(51) Int. Cl.[7] ......................... H04L 27/06; H03M 13/03
(52) U.S. Cl. ....................................... 375/341; 714/786
(58) Field of Search ................................ 375/262, 341, 375/316; 714/786, 792, 719

(56) References Cited

U.S. PATENT DOCUMENTS

| | | | | |
|---|---|---|---|---|
| 5,029,186 A | * | 7/1991 | Maseng et al. | 375/341 |
| 5,586,128 A | * | 12/1996 | Chen | 714/792 |
| 5,619,167 A | * | 4/1997 | Adachi | 329/304 |
| 6,002,716 A | * | 12/1999 | Meyer et al. | 375/231 |
| 6,347,125 B1 | * | 2/2002 | Dent | 375/341 |
| 6,701,483 B1 | * | 3/2004 | Heegard et al. | 714/791 |
| 6,728,322 B1 | * | 4/2004 | Asai et al. | 375/340 |
| 6,763,075 B2 | * | 7/2004 | Zhengdi et al. | 375/341 |

OTHER PUBLICATIONS

Paul et al., "The Lincoln Large–Vocabulary Stack Decoder HMM CRS," IEEE, 1993, pp 660–663.*

Douglas B. Paul "New Development in the Lincoln Stack Decoder based Large–Vocabulary CSR System," IEEE, 1995, pp 45–48.*

Fano, Robert M., "A Heuristic Discussion of Probabilistic Decoding," IEEE Transactions on Information Theory, Apr. 1963, pp. 64–74.

Viterbi, Andrew J., "Error Bounds for Convolutional Codes and an Asymptotically Optimum Decoding Algorithm," IEEE Transactions on Information Theory, Apr. 1967, pp. 260–269.

Kobayashi, Hisashi, "Correlative Level Coding and Maximum–Likelihood Decoding," IEEE Transactions on Information Theory, Sep. 1971, pp. 586–594.

Forney, Jr., G. David, "Maximum–Likelihood Sequence Estimation of Digital Sequences in the Presence of Intersymbol Interference," IEEE Transactions on Information Theory, May 1972, pp. 363–378.

* cited by examiner

*Primary Examiner*—Tesfaldet Bocure
(74) *Attorney, Agent, or Firm*—Abdul Zindani; W. James Brady, III; Frederick J. Telecky, Jr.

(57) ABSTRACT

A method and apparatus for joint equalization and decoding using a search-based decoding algorithm on a channel exhibiting intersymbol interference distortion is described. A sequence of information bits is encoded and modulated wherein a finite state machine described with a tree structure is implemented. The information bits are transmitted over a transmission channel having a finite impulse response. At the receiving end, a sequential decoding algorithm is used to retrieve the sequence of information bits. In one example embodiment, a Fano sequential decoder emulates the cascade of finite state machines formed by the trellis code and the channel finite response characterization to determine encoded symbols as prescribed by the path through the various branches of the tree in response to computed metrics. The distance metrics determine the path through the tree that best matches the received symbols.

12 Claims, 2 Drawing Sheets

JOINT EQUALIZATION AND DECODING USING A SEARCH-BASED DECODING ALGORITHM

This application claims the benefit of U.S. provisional application No. 60/226,161 filed on Aug. 18, 2000.

BACKGROUND OF THE INVENTION

The present invention relates to digital communications, and more particularly to a technique for detecting transmitted data over a communication channel in the presence of finite impulse response (FIR) intersymbol interference (ISI). The invention applies search based decoding methods for channels with FIR-ISI distortion.

Binary Convolutional Codes

In the early days in the field of error control coding, a new technique for encoding was suggested in P. Elias, "Coding for Noisy Channels," *IRE Convention Record*, vol. 3, pp. 37–47, 1955. This technique became known as a binary convolutional code (BCC). The idea was to encode binary data by passing the binary message stream through a linear, time invariant, filter with k binary inputs and n>k binary outputs. Linearity, in this case, refers to the fact that the binary alphabet, {0,1}, is a finite field with respect to addition and multiplication modulo 2.

As described in C. Heegard and S. Wicker, *Turbo Coding*, Kluwer Academic Press, ISBN: 0-7923-8378-8, 1999, there are two general classes of BCC encoders. In the first class, known as finite impulse response (FIR) encoders, each binary output of the encoder is a linear combination of the current k binary inputs and a set of v past inputs. The second class, the infinite impulse response (IIR) BCC encoders, compute the n binary outputs as a function of the current input, past inputs and past outputs. In either case, the encoder can be viewed as a finite state machine (FSM) with k binary inputs, n binary outputs and a state vector of length v. The n binary outputs and the v binary next-state elements are computed as linear combinations of the k binary inputs and the v current-state elements.

An example of an FIR BCC encoder is the 4-state (v=2), (k=1, n=2) BCC described by the equations:

$$c_j^1=m_j\oplus m_{j-2}$$

$$c_j^2=m_j\oplus m_{j-1}\oplus m_{j-2}$$

or, in terms of a FSM description:

$$c_j^1=m_j\oplus s_j^2$$

$$c_j^2=m_j\oplus s_j^1\oplus s_j^2$$

$$s_{j+1}^1=m_j$$

$$s_{j+1}^2=s_j^1$$

Search Based Decoding

After the advent of BCCs, much effort was expended in developing methods for decoding errors at the receiver in a BCC encoded data stream. Much of the early successful work involved tree searching algorithms, an area that is now commonly known as sequential decoding. In particular, an algorithm known as Fano's Sequential Decoding Algorithm was introduced and has been widely described. Other related algorithms, such as the Stack Algorithm, are techniques for decoding BCC using a search based approach. In these algorithms, the FSM description of the BCC is described as a tree where the nodes of the tree represent the state of the encoder. Branches (directed edges) in the tree are used to describe possible state transitions. The branches are labeled by the k-bit input and n-bit output. A path through the tree describes a concatenated sequence of branches that follow the tree. Associated with each path is an encoding that maps a sequence of k-bit input labels onto a codeword produced by the sequence of n-bit output labels.

Detection of a FSM over a Memoryless Channel

The technique of search based decoding can be applied to the problem of detecting the input sequence to a FSM observed over a memoryless channel. This problem is a central theme in many communications situations and is addressed by methods such as Viterbi decoding and decision feedback equalization. The present invention provides methods and apparatus to enable search-based algorithms to be used to solve the problem.

A memoryless channel is often described in terms of a conditional probability $p(y|x)$ that describes the distribution on the observation variable y conditioned on the input variable x. The channel is memoryless if the output at time j, $y_j$, is independent of the channel inputs and outputs at other times given the input at time j, $x_j$.

In search based decoding, the received sequence is sequentially compared to a path in the tree corresponding to a state sequence of the FSM. Typically, a branch metric is used as a measure of the closeness of the fit between the received symbol and the transition on a given branch. A typical branch metric for a memoryless channel is the log likelihood metric $B(m, s; y)=-\log(p(y|x))$, where x is the FSM output that corresponds to the input m and the state s. In the case of the additive white Gaussian noise (AWGN), the metric can take the form $B(m, s; y)=\|y-x\|^2$, which describes the energy difference between the input and the output.

Since the transmitted signal is described as a path through the code tree, the accumulated branch metrics along a path through the tree measures the closeness of the received sequence to the codeword described by the path. In search based decoding algorithms, a hypothesized path is rated in terms of the path metric that corresponds to the accumulated branch metrics. As long as the path metric grows as a rate that indicates that the hypothesized path is a reasonable fit, then the path is extended. If the path metric grows at an unacceptable rate, then the search algorithm tries an alternative path. In the case of the Fano algorithm, this involves going back along the current path and trying to find a viable alternative. In the case of stack type algorithms, a list of possible paths is maintained and an alternative path is considered once the current path looks problematic.

In search based decoding, once an error occurs (i.e., the hypothesized path diverges from the path chosen by the encoding of the data at the transmitter), the decoder should soon realize that a wrong turn has been made since it is expected that the path metrics should soon indicate a mismatch has occurred. During the subsequent search of the tree, it is hoped that the error is corrected by the eventual determination of the correct path. This is the essence of search based decoding methods.

Viterbi Decoding

After the advent of sequential decoding for BCCs, Viterbi discovered an optimal method for decoding BCCs over memoryless channels. See A. J. Viterbi, "Error Bounds for Convolutional Codes and an Asymptotically Optimum Decoding Algorithm," *IEEE Transactions on Information Theory*, vol. IT-13, pp. 260–269, April 1967; G. D. Forney, Jr., "The Viterbi Algorithm," *Proceedings of the IEEE*, vol. 61, March 1973; C. Heegard and S. Wicker, supra; and S. B.

Wicker, *Error Control Systems for Digital Communications and Storage*, Prentice Hall, 1995. In describing the Viterbi algorithm, Forney showed that the procedure can be described in terms of a trellis description of the code. In the trellis description of a BCC, a bipartite directed graph, called a trellis section, is employed. The trellis section describes one step of the encoding in terms of two complete sets of states. Each state transition allowed by the encoder is described by a branch labeled by the input and output.

The Viterbi algorithm became highly successful for decoding BCCs and other Trellis Codes. In fact it is now common to describe many codes, including linear block codes (LBC), in terms of trellises and Viterbi decoding, as discussed in C. Heegard and S. Wicker, supra.

The Viterbi Algorithm with FIR-ISI Channels

Soon after the discovery of the Viterbi algorithm, it was realized that the algorithm could be applied to other communications problems where the transmission system involves a FSM description. One of the most interesting examples of this approach is a FIR intersymbol interference (ISI) channel with white noise. See, e.g., G. D. Forney, Jr., "Maximum-Likelihood sequence estimation of digital sequences in the presence of intersymbol interference," *IEEE Transactions on Information Theory*, vol. IT-18, pp. 363–378, May 1972 and H. Kobayashi, Correlative Level Coding and Maximum Likelihood Decoding,"*IEEE Transactions on Information Theory*, vol. IT-17, no. 5, pp. 586–594, September 1971. In this model, which models channels with filtering distortion such as multipath, the output of the channel is described as a linear FIR filtering of the input signal followed by a memoryless noise channel. When the input signal set, called the Signal Constellation, is a finite set, then the FIR filter can be expressed as a FSM. It is this realization that led to the application of the Viterbi Algorithm to these communications problems.

The FIR-ISI channel is described in terms of:

1) A finite input signal set or constellation
2) An FIR impulse response, often described by a polynomial $h(z)=h_0+h_1z^{-1}+ \ldots h_\mu z^{-\mu}$ of degree $\mu$ (the number of terms is $\mu+1$)
3) A noise distribution, variance or correlation.

For example, FIG. 2B illustrates an FIR-ISI channel. The channel input $x_j$ takes on values in the QPSK signal set, QPSK=$\{1+i, -1+i, -1-i, 1-i\}$. There are two multipath terms, that is, the output $u_j$ of the FSM 210 depends on a combination of two inputs $x_j$ and $x_{j-1}$ according to $u_j=X_j+\alpha\cdot x_{j-1}$, where $\alpha$ is a complex number referred to as the multipath gain. The final output $y_j$ results from the addition of a noise component $w_j$ that is complex additive white Gaussian noise with variance $\sigma^2$. The impulse response in this example, $h(z)=1+\alpha z^{-1}$, has degree $\mu=1$. In this case, the FIR channel model has four states ($x_{j-1} \in$ QPSK) and a trellis section with 16 branches ($x_j$, $x_{j-1} \in$ QPSK).

Decision Feedback Equalization

A popular, sub-optimal, method for the detection of data over a FIR-ISI channel is known as decision feedback equalization (DFE). The DFE method can be briefly described as a recursive method of determining the path of the FSM that represents the FIR-ISI model of the transmission. The method works as follows. Assume at time j, the DFE has decided the value of the state of the FIR filter, $\bar{s}_j$. The DFE detects the value of the current input to the FIR filter. This detection can be achieved by finding the input that optimizes the branch metric $B(m_j, \bar{s}_j; y_j)$ over the choices of the input $m_j$. Once the channel input is decided, the value of the state of the FIR filter, $\bar{s}_j^+=\bar{s}_{j+1}$, is updated appropriately, based on the decision, and it is not subsequently changed.

Overview of the Present Invention

The present invention provides a new method for the detection of transmitted data over an FIR-ISI channel. The invention can be referred to as a "joint equalization and decoding" receiver solution, and advantageously applies search based decoding methods to channels with FIR-ISI distortion.

A main motivation for the inventive approach was to find an acceptable solution for decoding a FSM in the presence of noise with acceptable complexity. Although the Viterbi algorithm is often an optimal solution, the complexity can be prohibitive. For example, with the Viterbi algorithm, to decode a BCC with memory length v requires a complexity that is proportional to $2^{k+v}$; to decode an FIR-ISI channel is proportional to $M^{1+\mu}$ where M is the size of the input signal set. Both of these examples demonstrate an exponential dependency, in the memory length, of the complexity of the Viterbi algorithm. Search algorithms, on the other hand, have linear complexity in the memory length.

At the low end of complexity is the DFE. This method is much simpler than Viterbi detection, but can suffer considerable loss especially with a coded transmission system. The DFE approach can be considered as a degenerate form of search-based decoding. The DFE is like a Fano decoder with the alternative to re-examine a decision disabled. In effect, the DFE always moves forward regardless of the quality of the path metric. It is this rigid decision approach that leads to the "error propagation" problem that is often associated with the DFE method. Since a DFE does not use path metric information in the update procedure, this accumulated metric is not computed as part of a DFE.

The present invention is distinct from the DFE approach because, for example, (1) a path metric is used in the detection process and (2) there is a mechanism for reexamining examining a given decision with the intent of correction of possible tentative detection errors.

A preferred extension of the invention is the situation where the data to be transmitted is encoded by a trellis code, such as a BCC or LBC, and transmitted over an FIR-ISI channel. In this case, the transmission process is described in terms of the cascade of two FSMs, the first being the encoder and the latter the FIR-ISI filter. It is an easy exercise to prove that the cascade of two FSMs is itself a FSM where the number of states is at most equal to the product of the number of states of the two FSMs (this is an upper bound on the number of states). See, e.g., P. Elias, supra.

It is interesting to note that the number of states of the cascade, in many practical situations, is less than the upper bound. For example, a (k=1, n=2) BCC with state length v has $2^v$ states, an FIR-ISI channel with $\mu$ terms and QPSK inputs has $4\mu=2^{2\mu}$ states. If the n=2 binary outputs of the BCC are mapped onto QPSK symbols in a one-to-one correspondence and then used as the input to the FIR-ISI channel, then the cascade has $2^{v+\mu}$ states (not $2^{v+2\mu}$).

More interesting, in the case of search based decoding, is that the tree structure comprises a binary tree and not a 4-ary tree. For example, if a 4-state BCC is combined with a 4-state QPSK-FIR, the result is an 8-state model with a binary tree model.

The invention has been tested in a recent receiver design for a wireless local area network (WLAN) where a coded transmission system is transmitted over a multipath channel which introduces ISI. The coding in use combines BPSK, QPSK or 8-PSK modulation with either a BCC of rate ½ (64-state) or a BCC of rate ⅔ (256-state) or a linear block code known as "CCK" modulation. This receiver has proved to be very effective with a practical implementation complexity.

In the realization of the technique in practice, an estimate of the channel response must be made at the receiver and given to the search based decoder for the detection process. In a packet based system, the estimate can be made on the preamble of the packet and presented to the decoder before the data portion of the packet is to be processed. As an optional extension to the technique, an adaptive equalizer can be used to maintain the validity of the estimated FIR impulse response.

Summarizing,

1) An estimate of the impulse response, $\{h_i\}$, is obtained;

2) The impulse response and (optionally) the trellis code description is given to the decoder; and 3) The search based decoder detects the data based on the impulse response and (optionally) the trellis code.

An adaptive equalizer can also optionally be used before the decoder to maintain the channel model presented to the decoder.

SUMMARY OF THE INVENTION

The present invention is directed to a method and apparatus for using a search-based decoding algorithm to equalize, or jointly equalize and decode, a signal transmitted on a channel exhibiting ISI distortion using, e.g., the Fano sequential decoding algorithm.

A method in accordance with one embodiment of the invention comprises the steps of: (1) receiving data symbols and (2) applying a search-based decoding algorithm on the received data symbols. In the first step, the received data symbols result from encoding performed on a sequence of information bits as described by a cascade of finite state machine representations of an error control code in combination with the FIR-ISI communications channel. Tree structures describe the association between states, input values and output values for each of the finite state machines. In the second step, the search-based decoding algorithm emulates each of the finite state machines to compute estimates of received symbols along the branches of the tree. Subsequently, metrics are computed between the estimates of received symbols and the received data symbols to establish the closeness of fit between the branch outputs and the encoded data received. Finally, the trees are searched along paths determined by the computed metrics. These paths determine the symbol values sent by the encoder. In the presence of ISI distortion, one finite state machine is presented as a finite impulse response characterization that is presented to the decoder. The decoder uses this characterization to separate the effects of the ISI distortion from the received data symbols. The encoded data symbols can be presented to the decoder in the form of a trellis code. The decoding functions are carried out by a processor located within a receiver.

One embodiment of the present invention, an apparatus for joint equalization and decoding, comprises a channel estimator, a symbol estimator, a branch metric calculator, a Fano state machine, and an information retrieval module. The channel estimator uses the finite state machine representation of an FIR-ISI communication channel to estimate the modulation effect of the channel on the received symbols. The symbol estimator emulates the finite state machine to compute estimates of received data symbols along branches of the trellis. The branch metric calculator computes the metrics between the estimates of received symbols and a received sequence of data symbols. The Fano state machine determines which direction to proceed in (forward or backward) and which branch to choose based on the metrics. The information retrieval module, which may be an uncoder, retrieves the sequence of information bits from the symbol estimates associated with the path traced by the Fano state machine.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DETAILED DESCRIPTION OF THE INVENTION

Figure 1A:
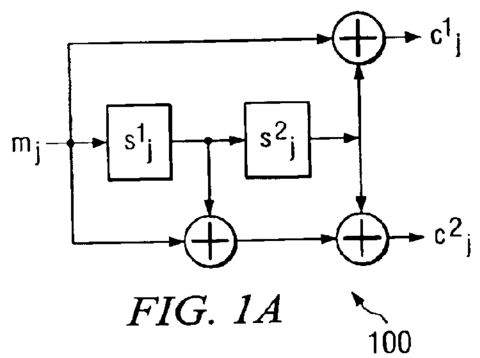
FIGS. 1A, 1B, and 1C show an exemplary binary convolutional code, a generic representation of a Finite State machine (FSM), and part of a tree diagram for the code.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings in general and FIGS. 1 through 5 in particular, the apparatus of the present invention is disclosed.

FIG. 1A shows an exemplary rate ½, 4-state binary convolutional code (BCC) encoder 100. The encoder of FIG. 1A has a polynomial generator equal to $(1+D^2, 1+D+D^2)$ or, in octal representation, (5,7). The BCC encoder 100 takes as input an information bit $m_j$ and outputs a codeword C $(C_{1j}, C_{2j})$ which is a convolutional combination of past and present information bits. The BCC encoder 100 of FIG. 1A is presented herein for illustration purposes only and other encoders that can be associated with a trellis can be used in accordance with the present invention.

Figure 1B:
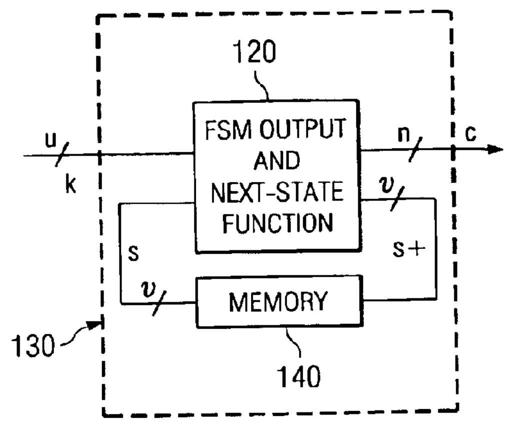
Figure 1C:
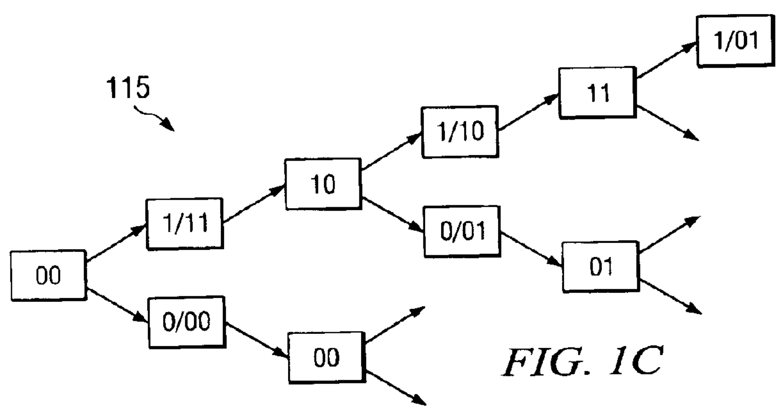

The encoder 100 of FIG. 1A may be viewed as a Finite State Machine (FSM) with k=1 binary input, n=2 binary outputs and a state vector of length v=2. FIG. 1B shows a generic representation of a FSM 130. The FSM 130 may be defined by three sets (S,U,C) where S is the FSM state set, U is the input set and C is the output set. The FSM 130 takes an input u from the set U and generates an output c in the set C based on the input and the current state s of the FSM 130. The next state $s^+$ is also generated from the input u and the current state s. As illustrated in FIG. 1B, an FSM output and next-state function 120 computes the output c and the next state $s^+$ as a function of the input m and the current state s. The memory 140 holds the next state $s^+$ which is presented to the FSM output and next-state function 120, at a subsequent time, as the current state s.

In general, a FSM may be described as a tree where the nodes of the tree represent the state of the FSM and the branches or directed edges are used to describe possible state transitions. Associated with each branch is an input-output label wherein the input represents the k-bit input and the output, the n-bit output. A path through the tree may be described as a concatenated sequence of branches that follow the tree. For example, in FIG. 1C a portion 115 of the tree for the FSM of the BCC 100 is shown.

Figure 2A:
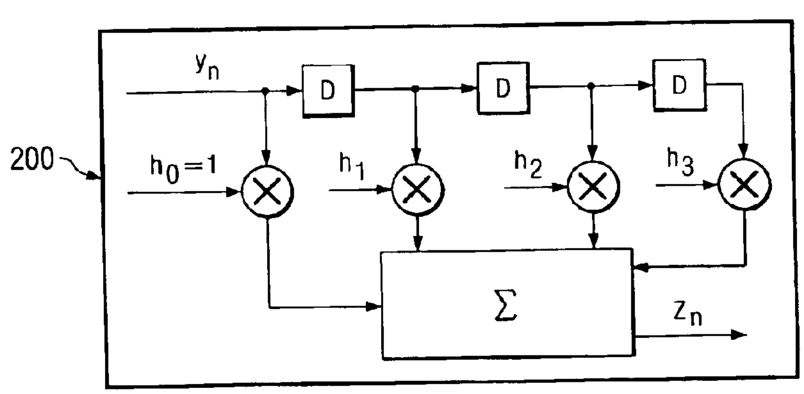
FIGS. 2A and 2B show a general representation of a communication channel with ISI, and an exemplary ISI channel.
Figure 2B:
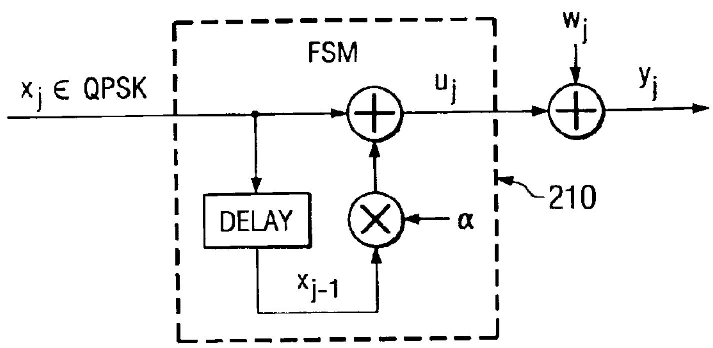

FIG. 2A shows an exemplary ISI channel 200 represented as a finite impulse response (FIR) filter wherein the output z(n) is dependent on the present and past inputs y(n), y(n−1), y(n−2), y(n−3)(for m=3), as defined by the general equation:

$$z(n) = \sum_{i=0}^{m} h_i \cdot y(n-i)$$

with the coefficients $\{h_1\}$ representative of the channel impulse response. The ISI channel 200 of FIG. 2A can also be represented, when the input set or signal constellation is a finite set, as a finite state machine (FSM) having a bounded number of states, wherein a present output is dependent on the state of the FSM and the present input. The specific ISI channel description 210 of FIG. 2*b*, shows a FSM representation where each output value, $y_j$, of the QPSK signal constellation is modulated by a finite impulse-ISI distortion. In such a case, the finite impulse response is the summation of the current input with the product of the previous input and the multipath-gain.

Figure 3:
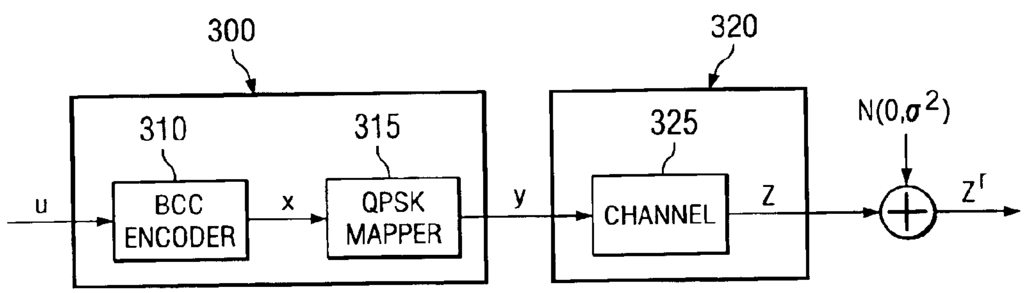
FIG. 3 shows a channel represented as a cascade of FSMs.

As an illustration of one specific situation in which the general method of this invention may be used, consider FIG. 3. This figure shows part of a digital communications system (DCS) comprising an exemplary BCC encoder 310, an exemplary modulator represented as a QPSK (Quadrature Phase Shift Keyed) mapper 315 and an ISI channel 325. This section of the DCS can be represented as a cascade of FSMs having a first FSM 300 comprising a BCC encoder 310 and a QPSK mapper 315 and a second FSM 320 representing the ISI channel 325, as illustrated in FIG. 3. The number of states of the first FSM 300 is determined by the constraint length v of the BCC encoder 310 and the size of the input alphabet and is equal to $2^v$ for a $\{0,1\}$ input alphabet. The second FSM 320 has as input a symbol drawn from a QPSK constellation (i.e., from an alphabet size of 4) and the channel memory length is equal to m. The number of states of such FSM is equal to $4^m$ or $2^{2m}$. The signal output by the second FSM 320 may be noisy. For example, the signal may be corrupted by additive white Gaussian noise having zero mean and variance $\sigma^2$ (signal $N(0, \sigma^2)$) to generate a signal $Z^r$ as shown in FIG. 3.

The cascade of FSMs is also a FSM with the number of states upper bounded by the product of the number of states of the individual FSMs, in this instance, by the product $(2^v)*(2^{2m})$ or $2^{v+2m}$. In the embodiment as illustrated in FIG. 3, each output of the BCC encoder 310 is mapped to one of the 4 symbols in the QPSK constellation, in a one-to-one correspondence allowing the number of states to be precisely equal to $2^{v+m}$ when $v \geqq 0$. Given the state of the BCC encoder 310, there are only two possible outputs of the BCC encoder 310 at any time and thus only two possible QPSK symbols that can be presented at the input of the second FSM 320. This property resulting from the combination of a rate ½ BCC encoder 310 with a QPSK mapper 315 and an ISI channel 325 allows determining the exact number of states in the cascade of FSMs. Use of the code generated by BCC 100 and a QPSK constellation is for illustration purposes only and the principle disclosed herein can be applied to any FSM.

Figure 4:
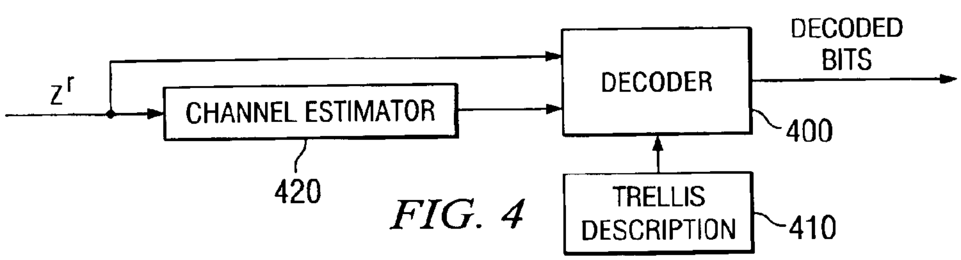
FIG. 4 shows a logic diagram of a receiver.

FIG. 4 shows a logical representation of the decoding portion of a receiver which can be used to decode symbols received over an FIR-ISI communication channel as illustrated in FIG. 3. In accordance with one embodiment of the present invention, the receiver performs joint equalization and decoding over the received symbols. As illustrated in FIG. 4, the received signal $Z^r$ is presented to a channel estimator 420 which estimates the channel coefficients $\{h_i\}$ which are representative of the channel impulse response. The channel impulse response may be estimated during transmission by using one of the well-known techniques of channel parameters estimation. As an example, in packet-based communication, the channel impulse response may be estimated from the preamble of the packets and presented to the decoder 400 before the data portion of the packet is to be processed. Alternatively, the channel impulse response may be pre-computed prior to communication and stored locally in the receiver. In this embodiment, an adaptive equalizer (not shown here) may be used to compensate for changes in the received impulse response, by reflecting these changes in the estimated impulse response.

In a preferred embodiment, the decoder 400 uses a search based decoding algorithm such as the Fano algorithm. Such decoding algorithms are well known to those skilled in the art. Other algorithms may be used as well. The search-based decoder 400 searches through the tree associated with the FSM or cascade of FSMs to determine the path having the best match with the received sequence of symbols. The symbols along the chosen path are then further processed to retrieve the information bits. A trellis description 410 can be used to define the first finite state machine 300. An implementation of the receiver using the Fano algorithm will be described in accordance with FIG. 5.

Figure 5:
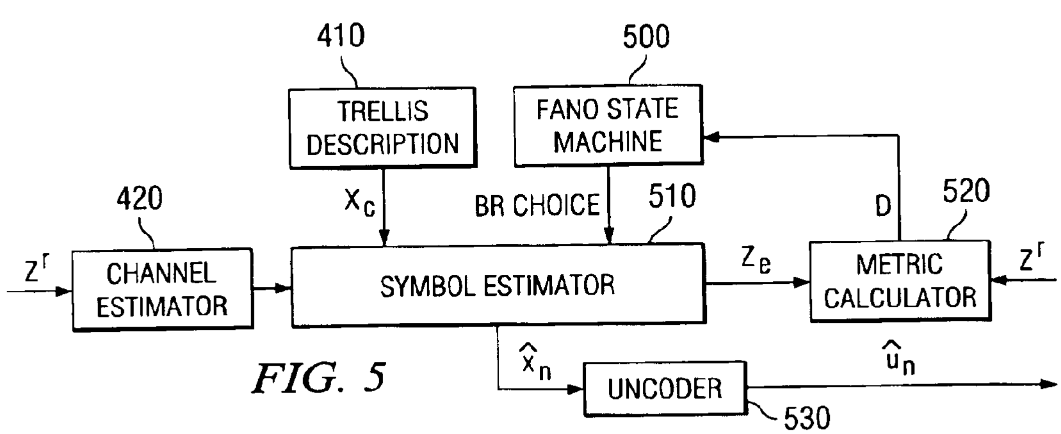
FIG. 5 shows a block diagram of a receiver based on the Fano search algorithm.

FIG. 5 is a block diagram of a receiver that can detect symbols received from a communication link (such as the one described in FIG. 3) and that performs joint equalization and decoding using a search-based decoding algorithm based on the Fano algorithm.

The symbol estimator 510 estimates the symbols generated by the channel by emulating the operation performed by the channel over the modulated symbols output by the encoder-mapper pair represented by the first FSM 300. In FIG. 5, the channel estimator 420 generates the coefficients representative of the channel impulse response. These coefficients are used by the symbol estimator 510, in combination with the modulated symbols $X_c$ provided by the trellis description 410, as directed by the Fano state machine 500, to compute the set of channel output estimates $Z_e$. In this embodiment, the trellis description module 410 emulates the first FSM 300 by providing modulated symbols associated with each of the branches of the trellis based on the current statereceived from the Fano state machine 500. The symbol estimates contained in the set $Z_e$ are passed to the metric calculator 520 to indicate the fit between the estimates and the received symbols $Z^r$.

The symbol estimator 510 generates an estimate of a channel output by adding, to the symbol corresponding to a branch of the trellis, the multipath terms obtained from previous estimates of modulated symbols and the FIR channel coefficients. A multipath term $MT_i$ is equal to the product $(h_i * \bar{y}_{n-i})$, where $h_i$ is the FIR channel coefficient described in accordance with FIG. 2 and $\bar{y}_{n-i}$ are past estimates of the modulated symbols along the chosen path. The symbol estimator 510 may have a memory or buffer for storing the estimates of the modulated symbols along the chosen path.

The symbol estimator 510 provides the branch metric calculator 520 with the set $Z_e$ of estimates of received symbols that correspond to all possible symbols that can be output by the second FSM 320, given the current state of the first FSM 300. The branch metric calculator 520, which also has as input the received symbols $Z^r$, computes all of the branch metrics associated with each of these symbols. The branch metric calculator 520 passes the set of branch metrics D to the Fano state machine module 500. The Fano state machine module 500 determines which branch the symbol estimator 510 should proceed on and whether to proceed backward or forward based on comparisons between path metrics and a threshold. The Fano state machine 500, by instructing the symbol estimator 510 to proceed on a specific direction and branch, traces a path through the trellis wherein the symbols along the path match with the symbols received from the cascade of FSMs.

The uncoder 530 retrieves estimates $\hat{u}_n$ of the information bits u (shown in FIG. 3) transmitted through the cascade of FSMs. In one embodiment, the estimates of the information bits are computed from estimates $\hat{x}_n$ of symbols along the path which best matches the symbol received.

The application of the Fano sequential decoding algorithm to the joint equalization and decoding system removes any memory size or constraint length limitation imposed by a practical use of the Viterbi Algorithm. In effect, the method and apparatus of the present invention can, for example, be used in a communications system employing a 256 state, rate ⅔ BCC combined with an 8-PSK modulator over a FIR channel with a memory length of 8. Such a system results in a number of states equal to $2^{24}$, which is beyond the limits of operation of a practical Viterbi decoder.

The present invention is ideally suited to detect signals transmitted over a channel exhibiting intersymbol interference. It may be implemented through software, hardware or a combination thereof. It can be applied as embedded software in a Digital Signal Processor (DSP) or as an Application Specific Integrated Circuit (ASIC). Other implementation methods may also be used.

Although the invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for decoding transmitted data symbols over a communication channel exhibiting intersymbol interference comprising the steps of:

receiving said data symbols, said symbols resulting from encoding performed on a sequence of information bits via a cascade of finite state machine representations of an error control code in combination with said communication channel; and applying a search-based decoding algorithm to the received data symbols, wherein said search-based decoding algorithm:

emulates each finite state machine representation and computes estimates of received symbols as it moves along the branches of a tree representative of said finite state machine representations, computes metrics between the estimates of received symbols and the data symbols actually received, and searches paths of the tree in an order and direction determined by the computed metrics.

2. A method in accordance with claim 1, wherein a finite state machine representation of said communication channel comprises a finite impulse response characterization.

3. A method in accordance with claim 1, wherein a finite state machine representation of said encoded data symbols comprises a trellis.

4. Apparatus for decoding transmitted data symbols over a communication channel exhibiting intersymbol interference comprising:

a receiver for receiving said data symbols, said symbols resulting from encoding performed on a sequence of information bits via a cascade of finite state machine representations of an error control code in combination with said communication channel; and a processor for applying a search-based decoding algorithm to the received data symbols, wherein said search-based decoding algorithm:

emulates each finite state machine representation and computes estimates of received symbols as it moves along the branches of a tree representative of said finite state machine representations, computes metrics between the estimates of received symbols and the data symbols actually received, and searches paths of the tree in an order and direction determined by the computed metrics.

5. Apparatus in accordance with claim 4, wherein a finite state machine representation of said communication channel comprises a finite impulse response characterization.

6. Apparatus in accordance with claim 4, wherein a finite state machine representation of said encoded data symbols comprises a trellis.

7. Apparatus for joint equalization and decoding of data symbols transmitted over a communication channel, comprising:

a channel estimator;

a symbol estimator;

a branch metric calculator;

a sequential decoding algorithm; and an information retrieval module;

said channel estimator using finite state machine representation of said communication channel to estimate the modulation effect of said channel on received symbols;

said symbol estimator emulating a finite state machine to compute estimates of received data symbols as the algorithm moves along branches of a trellis;

said branch metric calculator computing metrics between the estimates of received symbols and a received sequence of data symbols;

said sequential decoding algorithm being responsive to said metrics for determining which of a forward and backward direction to proceed in and which branch of said trellis to choose; and said information retrieval module retrieving the sequence of information bits from the symbol estimates associated with a path traced by the sequential decoding algorithm.

8. Apparatus in accordance with claim 7, wherein said sequential decoding algorithm comprises a Fano State Machine.

9. Apparatus in accordance with claim 7, wherein said information retrieval module comprises an uncoder.

10. A computer readable medium, having thereon computer program code for decoding transmitted data symbols, said program code applying a search-based decoding algorithm to received data symbols, wherein:

said symbols result from encoding performed on a sequence of information bits via a cascade of finite state machine representations of an error control code in combination with a communication channel; and said search-based decoding algorithm:

emulates each finite state machine representation and computes estimates of received symbols as it moves along the branches of a tree representative of said finite state machine representations, computes metrics between the estimates of received symbols and the data symbols actually received, and searches code tree paths in an order determined by the computed metrics.

11. A medium in accordance with claim 10, wherein a finite state machine representation of said communication channel comprises a finite impulse response characterization.

12. A medium in accordance with claim 10, wherein a finite state machine representation of said encoded data symbols comprises a trellis.

* * * * *